United States Patent [19]

Shoji et al.

[11] Patent Number: 5,781,900

[45] Date of Patent: Jul. 14, 1998

[54] FLEXIBLE HYPERLINK ASSOCIATION SYSTEM

[75] Inventors: Wataru Shoji; Daisuke Tabuchi; Ichiro Nakajima, all of Tokyo, Japan; Gabriele Gramlich, Leverkusen, Germany

[73] Assignee: Sofmap Future Design, Inc., Tokyo, Japan

[21] Appl. No.: 582,004

[22] Filed: Jan. 2, 1996

[51] Int. Cl.⁶ .................................................. G06F 17/30
[52] U.S. Cl. ........................................ 707/6; 707/1
[58] Field of Search ......................... 395/601, 602, 395/603, 604, 605, 606, 611, 612, 613, 614, 615, 356, 770, 793; 707/1, 2, 3, 4, 5, 6, 100, 101, 102, 103, 104

[56] References Cited

U.S. PATENT DOCUMENTS

| | | | |
|---|---|---|---|
| 5,297,249 | 3/1994 | Bernstein et al. | 395/356 |
| 5,537,590 | 7/1996 | Amado | 395/602 |
| 5,539,903 | 7/1996 | Kaplan et al. | 395/614 |
| 5,579,466 | 11/1996 | Habib et al. | 395/793 |
| 5,630,122 | 5/1997 | Kaplan et al. | 395/604 |
| 5,632,009 | 5/1997 | Rao et al. | 395/770 |

FOREIGN PATENT DOCUMENTS

WO 95/04974  2/1995  WIPO .

OTHER PUBLICATIONS

Q. Qian, et al..; Abstration and Inheritance of Hyperlinks in an Object Oriented Hypertext Database Sysetm;. IEICE Transaction on Information and System; Nov. 1995, No. 11, Toykyo, Japan; pp. 1343–1352.

W. Hall; Ending the Tyranny of the Button; IEEE Multimedia. vol. 1, No. 1, Spring 1994 pp. 60–68.

*Primary Examiner*—Thomas G. Black
*Assistant Examiner*—Ruay Lian Ho
*Attorney, Agent, or Firm*—H. C. Chan

[57] ABSTRACT

The operation of a computer system can be determined by the content of highlighted data on a display device. In this computer system, the highlighted data could be located anywhere on the display device. The highlighted data is not related to any embedded links. In one embodiment, a temporary storage buffer is used to store data highlighted by a user. The computer system also contains a table (or database) associating a list of data with a list of computer operations. When a pre-assigned key is pressed, the content of the temporary storage buffer is compared with the list of data in the database. When there is a match, the associated operation is performed. As a result, the operation performed is related to the content of the highlighted data.

11 Claims, 11 Drawing Sheets

FLEXIBLE HYPERLINK ASSOCIATION SYSTEM

FIELD OF THE INVENTION

The present invention relates to computer programs, and more particularly to computer programs which can associate an operation performed by a computer with captured data appearing on a display device of the computer.

BACKGROUND OF THE INVENTION

Many computer programs display information on a display device, such as a video monitor. The information is generally in the form of text and graphic data. It is sometimes desirable to allow a user to highlight a portion of the displayed information and the computer program immediately performs a desired operation related to the highlighted information. Two examples are described below to show the usefulness of such ability. One example is a children's learning program in which a child can type in a word anywhere on the display device, press a pre-assigned key, and the computer can pronounce the word. In another example, the information is a regular text document generated by a commonly used word processing program (e.g., Microsoft Word or WordPerfect). A user can highlight a word in the document, press a pre-assigned key, and a multimedia (audio, graphic, etc.) presentation related to the highlighted word is played.

There are prior art programs which associate a text string or an icon with specific operations of a computer. For example, many educational programs display text and graphics on a computer monitor. A child can highlight a word (or click on an icon) and the computer programs can pronounce the word (or perform a predetermined operation associated with the icon). However, the position and content of the highlighted area is fixed because it is generated by the computer program. Thus, the computer program can easily determine the word being highlighted based on its position (instead of its content), and perform the necessary operations. These programs do not allow a child to type in any word at any position on the display device, and then performed an operation related to the content of the word. Further, the association between the highlighted word and the operation (e.g., pronounce the word) is fixed, and the user cannot alter the relationship.

There are "hyperlinked" documents which allow a user to highlight an object, and the associated programs will link the object to other documents. One example is documents coded in a standard Hypertext Markup Language (HTML) format. These documents are typically used in a world-wide computer network called the Internet. A user can use a browser to retrieve an HTML document from a remote server and display it on his computer. Typically, the display contains text and graphics, although it is possible to show sound and movie. These documents embed links to other HTML documents. The user can click on predetermined locations of the document, and a predetermined HTML document will be retrieved from the same or another server. However, all the links are built in the HTML document. The user cannot create a new link or alter the position and content of the embed link.

Many word processing programs allow a user to highlight a word, press a pre-assigned key (e.g., one of the F-keys in a IBM compatible personal computer), and change the display format of the word (e.g., bold, italics, etc.).

These word processing programs perform the same operation every time the same pre-assigned key is pressed. The operation does not depend on the content of the highlighted word.

SUMMARY OF THE INVENTION

The computer system of the present invention uses a temporary storage buffer to store data highlighted by a user. The highlighted data could be located anywhere on a display device of the computer system. The system also contains a table (or database) associating a list of data (e.g., character strings) with a list of computer operations. When a pre-assigned key is pressed, the content of the temporary storage buffer is compared with the list of data in the database. When there is a match, the associated operation is performed. As a result, the operation performed is related to the content of the highlighted data.

The relationship between the data and the computer operation can be changed by comparing the content of the temporary storage buffer with different tables (or databases). Thus, the same data gives rise to different computer operations, when different tables are selected for comparison with the data.

In one embodiment of the present invention, the temporary storage buffer is the clipboard buffer in MS Windows environment. The user use a mouse to highlight a word and press a pre-assigned key (e.g., control-C). The computer system captures the word and compare it with words in a database.

If there is a match, the computer performs an operation indicated in the database and associated with the word (e.g., pronounce the word). If there is no match, an "action editor" is displayed, which allows the user to enter into the database an action associated with the unmatched word.

The clipboard could be used to capture graphics. In this case, the database compares the captured graphics with graphic data stored therein.

These and other features and advantages can be understood from the following detailed description of the invention together with the accompanying drawings.

DETAILED DESCRIPTION OF THE INVENTION

The present invention is directed to a novel flexible hyperlink association system. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
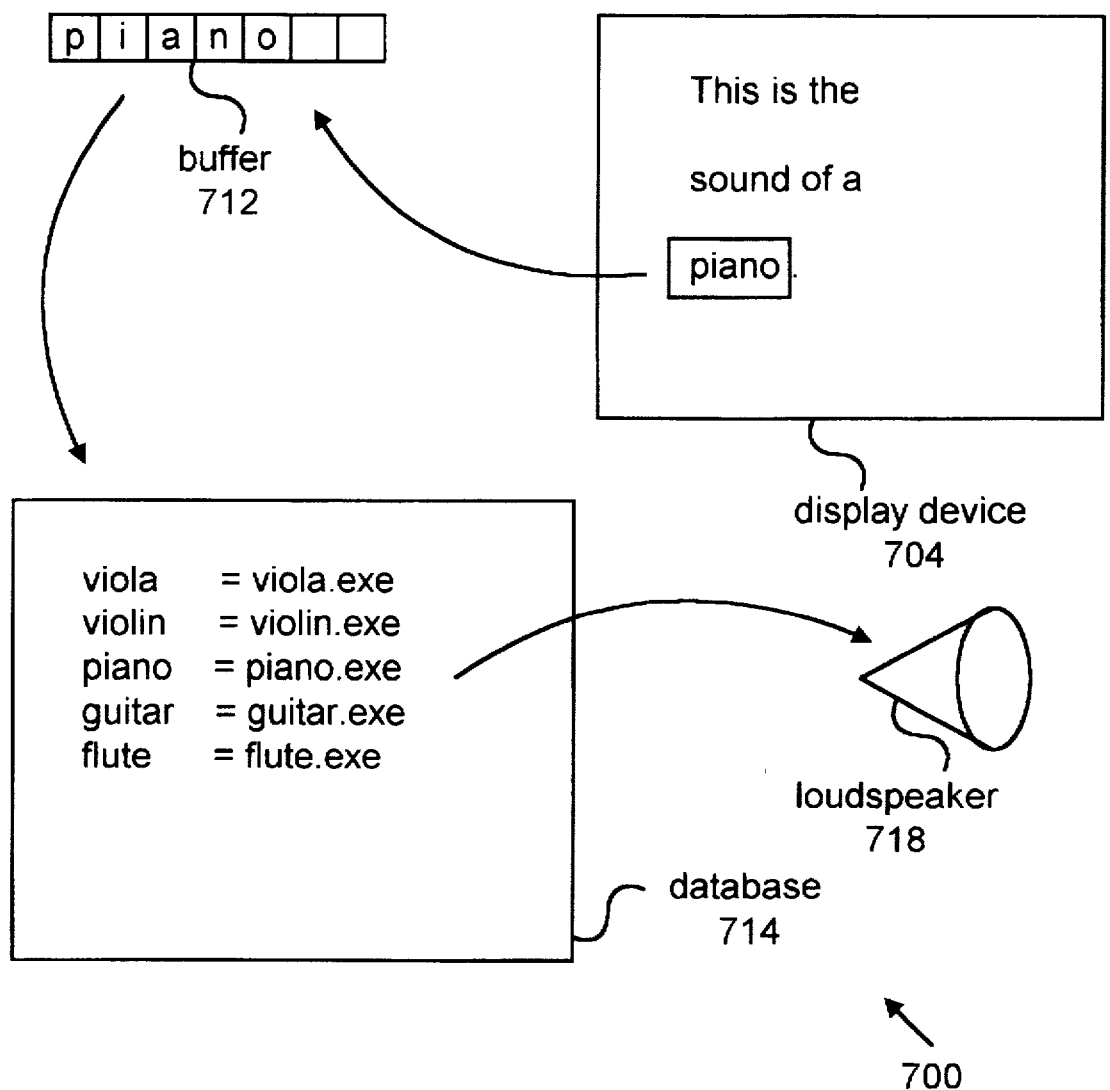
FIG. 1 is a schematic drawing of a computer system operating in accordance with the present invention.

FIG. 1 is a schematic drawing of a computer system 700 which is able to implement a flexible hyperlink association system in accordance with the present invention. Computer system 700 contains a display device 704. An exemplary ASCII character string 706, "this is the sound of a piano", is displayed on display device 704. The word "piano" is highlighted. A user presses a pre-assigned key, e.g., control-C. Computer system 700 captures the highlighted word, "piano" in a buffer 712. It should be appreciated that the word can be captured to buffer 712 while it is being highlighted or after the pre-assigned key is pressed.

After the pre-assigned key is pressed, computer system 700 accesses a database 714 already loaded in the system memory of computer system 700. Database 714 contains a plurality of lines. Each line can be considered a record, which contains the name of a musical instrument, an equal sign, and the name of a program module (e.g., a file having an "EXE" extension). The equal sign is an association symbol. The operation performed by the program module corresponds to the operation performed by computer system 700. It should be appreciated that any symbol (e.g., the "*" symbol) could be used as an association symbol. The programs associated with the operations could have any format executable by computer system 700 (e.g., files having "WAV", "BMP" and other extensions).

In this embodiment, computer system 700 compares the word in buffer 712 with the words in database 714 to the left of the equal sign. A match is found, and the program corresponds to the word "piano" is "piano.exe". Computer system 700 then invokes the program "piano.exe". This program causes computer system 700 to play a piece of piano music. As a result, a piece of piano music is played by loudspeaker 718.

In a computer system, the operating system determines the steps need to be taken to invoke a program module. It should be easy for persons skilled in the art to write a routine which can follow these steps to invoke a desired program module listed in database 714.

It can be seen from FIG. 1 that the word "piano" can occur anywhere on display device 704. Further, the program being executed depends on the content of the highlighted word. Thus, a different program will be executed if a different word is highlighted.

In database 714 of FIG. 1, the name of the program (e.g., piano.exe) is textually similar to its associated word (e.g., piano). It should be noted that the two could be completely different.

The way data is highlighted depends on the structure of computer system 700. In a IBM-compatible computer running under Microsoft Windows environment, data can be highlighted by positioning a cursor (not shown) at a first location on display device 704, depressing a button on a mouse (not shown), and moving the cursor to a second location. Other programs highlight data using other procedures (e.g., Wordperfect running under Microsoft DOS requires the use of a pre-assigned key, "F12", to designate the beginning of highlighted data).

In this embodiment, database 714 has been loaded into system memory from nonvolatile memory (e.g., hard disk, floppy diskette, or CD-ROM) prior to the pressing of the pre-assigned key. It is possible for the user to load a different database into the system memory. It is also possible for the user to load a plurality of databases into the system memory, and select one of these databases (or switch to a different database) to be an active database for comparing with the highlighted word. For example, the user can select a database associating words with graphic images. In this case, a picture of a piano would be displayed when the word "piano" is highlighted.

The flexible hyperlink association system of the present invention can be implemented using a novel "bossless" computer program architecture comprising a plurality of program modules called "cells." Under this architecture, each cell is hierarchically equal, i.e., there is no controlling (or boss) cell. An application can start from any cell, and can terminate at any cell. Typically, many cells are executing either sequentially or concurrently. Various applications can be designed by controlling the operation of these cells. A detailed description of this computer program architecture can be found in a copending patent application (Ser. No. 08/539,806) filed Oct. 5, 1995 and entitled "Bossless Architecture and Digital Cell Technology for Computer Programs." This copending patent application is hereby incorporated by reference. A detailed description of using this architecture to implement the flexible hyperlink association system of the present invention is provided below in a separate section.

In this embodiment of the flexible hyperlink association system, two cell are created to implement the system. One cell is called a clipboard scanning cell and the other cell is called a hyperlink cell. The clipboard scanning cell places highlighted text string in a clipboard buffer commonly used in a windows based operating environment (e.g., Microsoft's Windows software). The clipboard scanning cell is also responsible for detecting the pressing of a pre-assigned key by a user. The second cell is a hyperlink cell which compares the text string in the clipboard with text strings in a database. It also causes the computer system to execute appropriate operations when the text string in the clipboard matches a text string in the database. If there is no match, the hyperlink cell allows a user to edit the database and enter an operation associated with the unmatched text string.

Each cell is associated with a file, called a DNA file. The characteristics and operation of the cells are determined by their associated DNA files. Cells communicate by writing statements to the DNA files associated with other cells using a protocol called digital shifting function (DSF). Once written, the origin of these DSF statements is ignored. There is no need to "return" to the cells which originate the statements. Further, the DSF statements are executed by the cells without regard to their origins.

The cells execute DSF statements in their associated DNA files. These statements are executed sequentially. The cells retain full control of the execution, i.e., there is no need to turn over execution to other cells during or after the execution of statements. There is no need to report to other cells on the status or results of execution.

In a preferred computer system of the present invention, many cells (in addition to the clipboard scanning and hyperlink cells) are executing in the computer system.

Various applications can be designed by controlling the operation of these cells.

Figure 2:
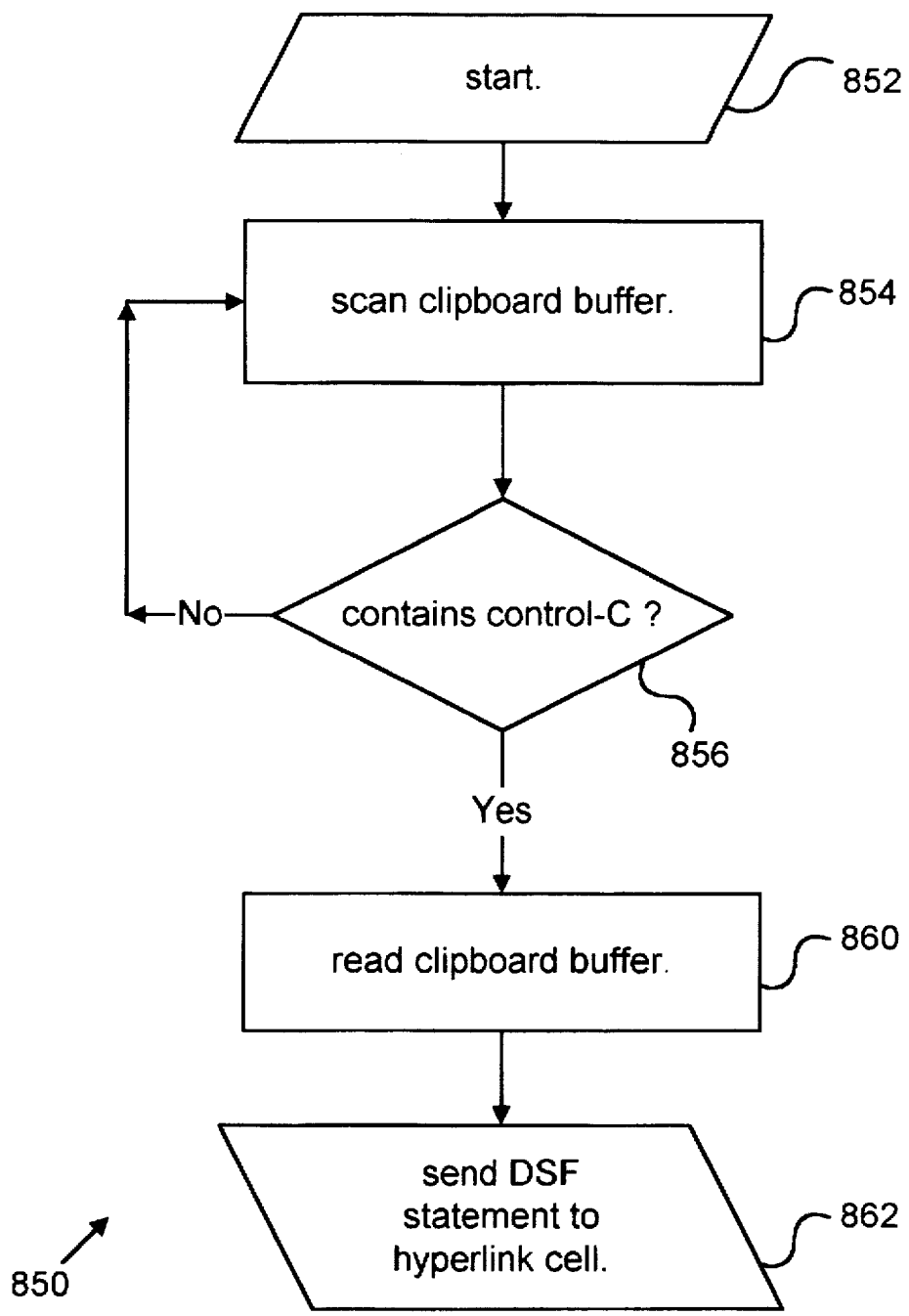
FIG. 2 is a flow chart of a clipboard scanning cell of the present invention.

FIG. 2 is a flow chart 850 of a clipboard scanning cell of the present invention. Flow chart 850 starts at step 852. At predetermined time periods, the clipboard scanning cell scans the clipboard buffer, which is maintained by MS Windows (step 854). In step 856, the scanning cell determines whether the buffer contains a Control-C symbol. If this symbol is not detected, flow chart 850 branches back to step 854. If this symbol is detected, scanning cell reads the content of the clipboard (step 860). It then sends a DSF statement to a hyperlink cell (step 862). For example, if the content of the clipboard buffer is a word "piano", the syntax of the DSF statement is "SEARCH piano", the word "piano" is a parameter of the SEARCH statement corresponding the content of the clipboard.

It should be appreciated that the control-C key and the "SEARCH" keyword are exemplary. Other symbols and keywords could be used.

Figure 3A:
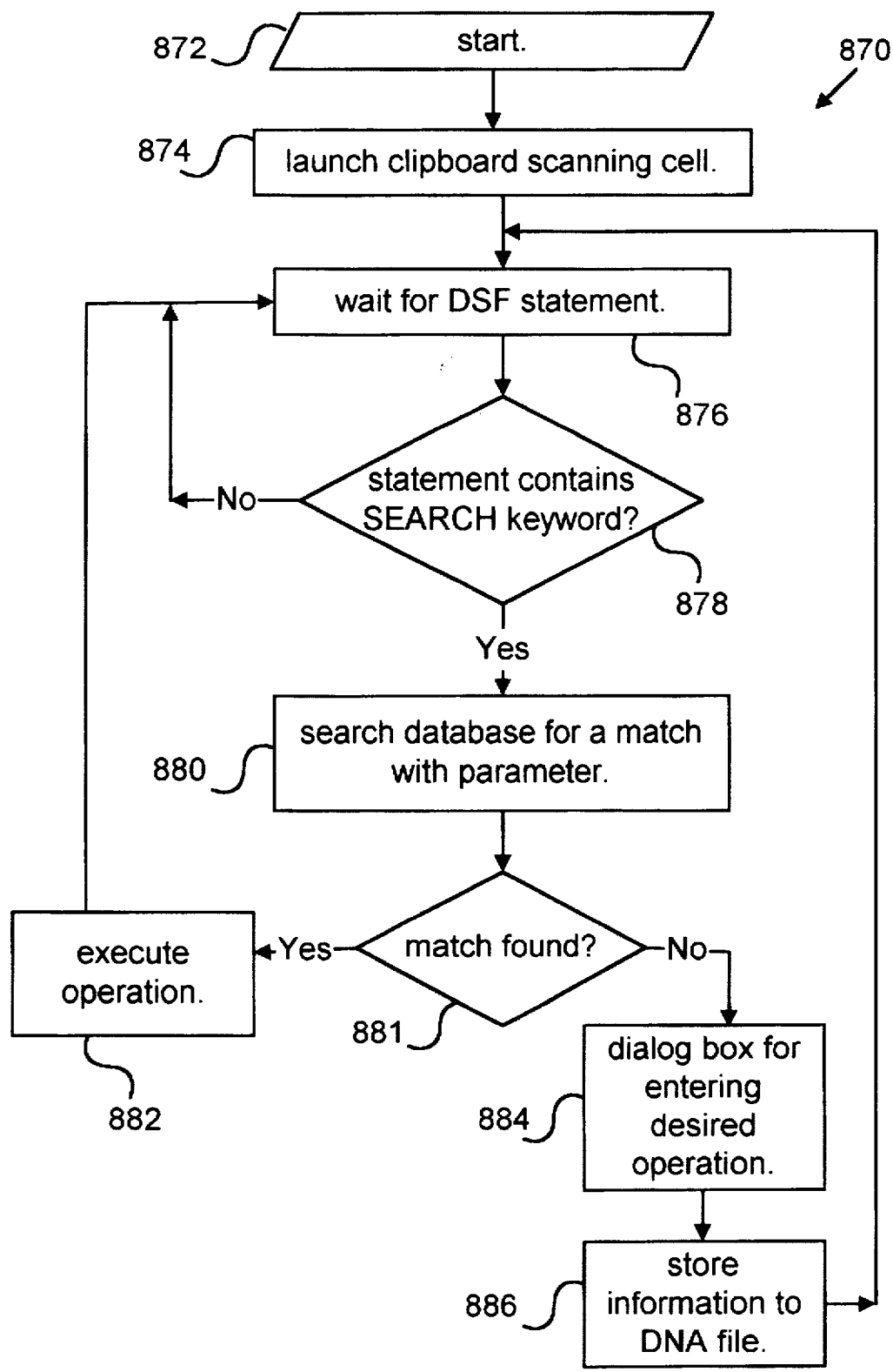
FIG. 3A is a flow chart of a hyperlink cell of the present invention.

FIG. 3A is a flow chart 870 of a hyperlink cell of the present invention. In this embodiment, the database (corresponding to database 714 of FIG. 1) accessible by the hyperlink cell is stored in its DNA file. Flow chart 870 starts at step 872. At step 874, it launches the clipboard scanning cell. Flow chart 870 then waits for a DSF statement from the scanning cell (step 876). If a DSF statement is received, flow chart 870 determines whether the DSF statement contains a "SEARCH" keyword (step 878). If the "SEARCH" keyword is not found, flow chart 870 branches back to step 876. If a "SEARCH" statement is received from the scanning cell, the hyperlink cell searches its DNA file (i.e., database) for a record having a field which is the same as the parameter in the "SEARCH" statement (step 880). Flow chart 870 then determines whether there is a match (step 881). If such a record exists, the operation associated with this parameter is performed (step 882). Flow chart 870 then branches back to step 876 and wait for another DSF statement. If such a record does not exist, flow chart 870 goes into an edit mode. A dialogue box is displayed asking a user to enter the operation to be associated with this parameter (step 884). This information is stored in the DNA file of the hyperlink cell (step 886). Flow chart 870 then branches back to step 876 to wait for another DSF statement.

It should be appreciated that the database could be stored in any place. The DNA file of hyperlink cell is merely a convenient place to hold the database.

Figure 3B:
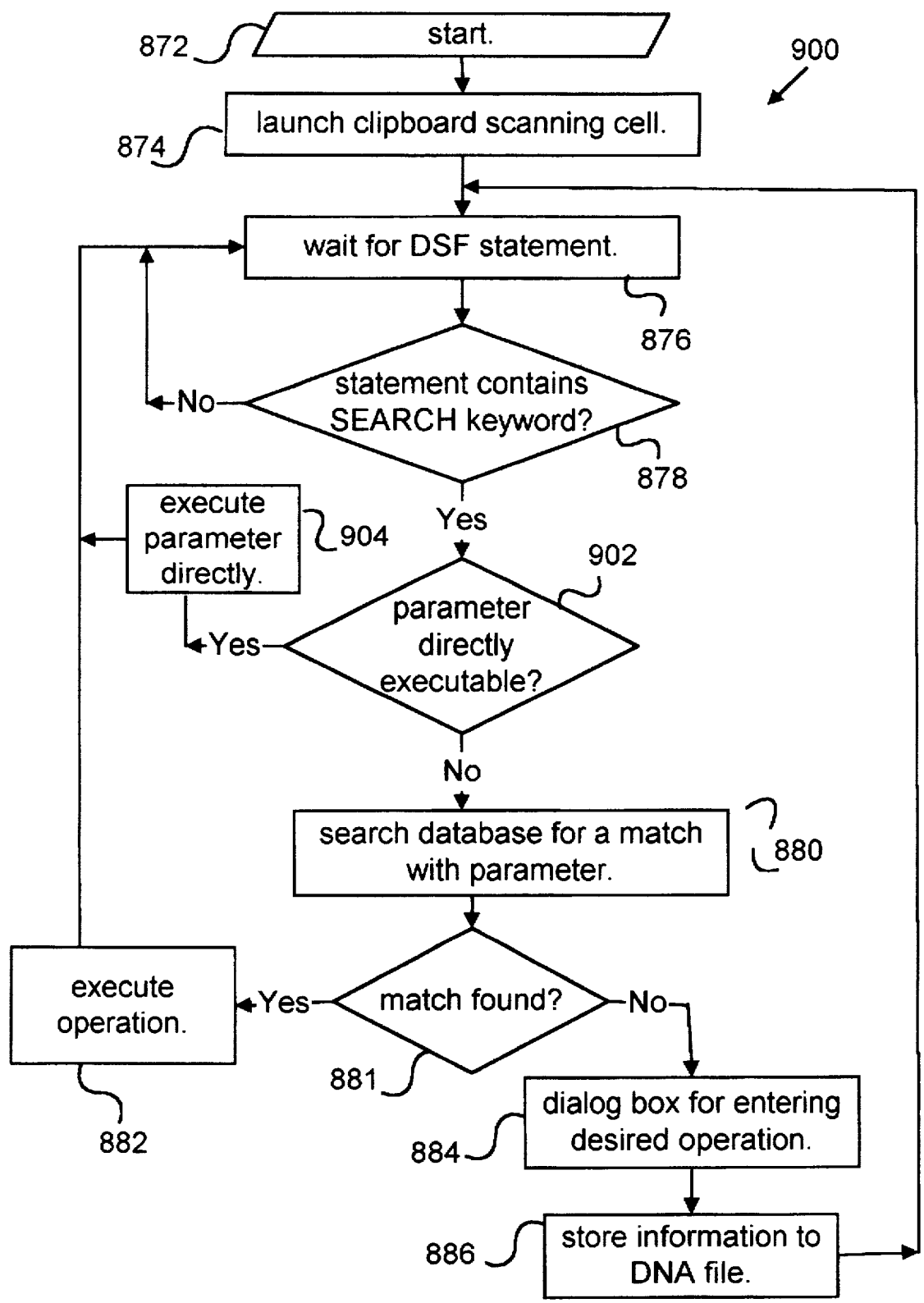
FIG. 3B is a flow chart of another hyperlink cell of the present invention.

FIG. 3B is a flow chart 900 of another hyperlink cell of the present invention. Common reference numerals in flow charts 870 and 900 refer to the same steps. In flow chart 900, two new steps (step 902 and 904) can be inserted between step 878 (i.e., received a "SEARCH" statement) and 880 (i.e., search the database). After a "SEARCH" statement is received, flow chart 900 determines whether the parameter can be executed directly without searching the database (step 902). If the answer is yes (i.e., parameter directly executable), flow chart 900 executes the parameter directly (step 904). For example, if the parameter (i.e., highlighted word) is a executable filename (as determined by the underlying operating system), it is directly executable. An alternative design is to execute parameters having predefined extensions (e.g., "WAV", "BMP", "EXE", etc.). In this case, computer system 700 searches for a file in the hard disk having the same filename as the ASCII characters in the parameter. When such a file is found, the computer program stored in the file is then launched. Flow chart 900 then branches to step 876 (i.e., wait for another DSF statement).

If the answer is negative (i.e., parameter not directly executable), flow chart 900 branches to step 880 (i.e., search the database).

It should also be appreciated that steps 902 and 904 could be inserted into other places of flow chart 870. For example, these two steps could be inserted between steps 881 and 884. Further, a single cell combining the functionalities of the hyperlink and clipboard scanning cells can be used in the present invention (i.e., the single cell can implement the capturing of data, comparing with a database, and invoking a computer operation).

It should also be appreciated that the flexible hyperlink association system can be implemented using convention computer program architecture instead of the digital cell technology. In this case, the hyperlink and clipboard scanning cells can be implemented as two conventional procedures. The communication between the two procedures can be implemented using ordinary procedure calls or using a storage area accessible by both procedures (i.e., one procedure can write to and the other procedure can read from the common storage area). Further, it is possible to use one procedure to implement the capturing of data, comparing with a database, and invoking a computer operation.

Implementation of the Flexible HyperLink Association System Using Digital Cell Technology The digital cell technology can be considered a "bossless" architecture because every program module is on equal footing with other program modules. There is no module that controls the overall operation of the program (i.e., no boss). A comparison of the convention boss architecture (FIGS. 4A and 4B) and the bossless architecture (FIG. 4C) is shown below.

Figure 4A:
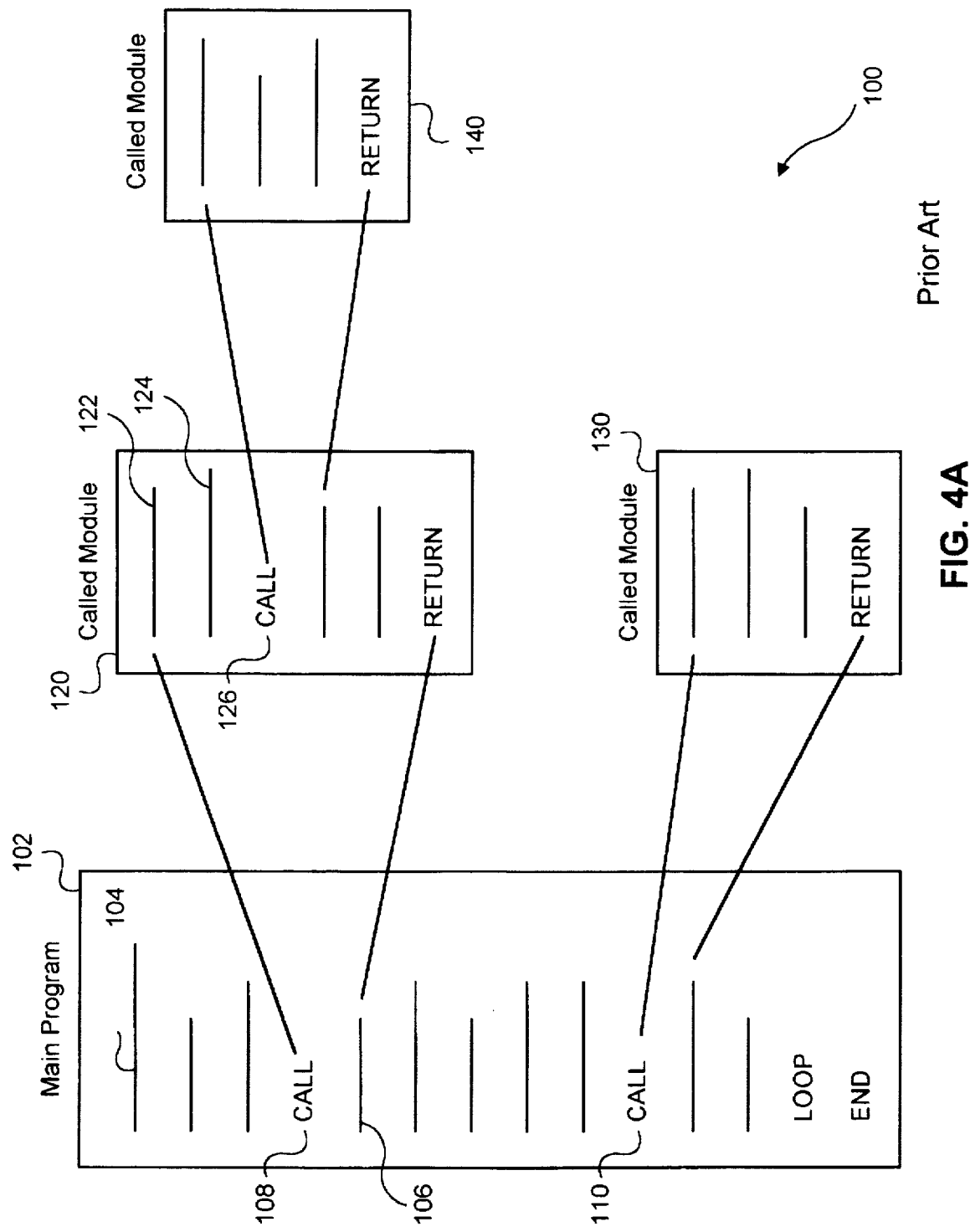
FIGS. 4A and 4B are schematic diagrams of a conventional computer program architecture.

FIG. 4A is a schematic diagram of a program 100 having such an architecture. In FIG. 4A, a main program 102 contains a plurality of statements, such as 104 and 106. Some of the statements could be CALL statements, such as statements 108 and 110. These two CALL statements, when executed, will invoke program modules 120 and 130. Main program 102 may contain a LOOP statement which causes main program 102 to execute continuously in a loop. Main program 102 also contains a STOP statement for terminating the program. It should be appreciated that program 100 could be written in different programming languages, and the precise syntax of the statements and program structure could vary with the programming languages.

Program 100 contains a plurality of program modules, such as modules 120 and 130, called by main program 102. Module 120 contains a plurality of statements, such as statements 122 and 124. It could also contain a plurality of CALL statements, such as statement 126. This statement, when executed, will invoke another module 140. Finally, module 120 contains a RETURN statement.

When CALL statement 108 is executed, main program 102 jumps to module 120. Statements 122, 124 and the rest of the program are executed. Upon executing the RETURN statement in module 120, program 100 returns to statement 106, which is the statement following CALL statement 108. At this time, the control of program 100 is returned to main program 102. Main program 102 continues to execute.

The structure of all the modules is similar to that of module 120. Similarly, the jump-return mechanism, described above, is carried out by all the CALL statements in program 100. Consequently, they will not be further described in this specification.

In order to carry out this jump-return mechanism, the return addresses of the CALL statements need to be saved in RAM (typically in a memory structure called a stack). Other essential state information of the computer prior to jumping to the called module, such as values of registers, may also be saved if there is a need to do so (e.g., when jumping to an interrupt service routine). Thus, when main program 102 calls module 120, the contents of these registers may also be pushed (i.e., saved) in the stack. Similarly, when module 120 calls module 140, the return address of module 120 also needs to be saved. The contents of appropriate registers may need to be pushed in the stack. Thus, the size of the stack could be large when a large number of CALL statements are executed.

When a RETURN statement is executed, the return address is used to return to the calling program. The saved information is also retrieved.

Typically, a program in the above described conventional architecture contains many CALL statements and many modules. These modules could call other modules (e.g., module 120 can call module 140), thereby forming a chain of CALL statements. The precise history of this chain needs to be preserved so that the last called module can return to the main program. One of the problems of the conventional architecture is that the time to travel the chain could be very long. As pointed out above, each time a CALL statement is invoked, certain amount of state information needs to be saved, resulting in overhead in execution. Each time a RETURN statement is executed, the saved information needs to be restored, again requiring overhead in execution. As a result, the execution speed of programs written using conventional architecture is slow.

The following are some of the characteristics of the conventional architecture: (a) there is a controlling ("boss") program, e.g., main program 102, (b) all the linkage information (e.g., return address and registers) needs to be preserved when one part of the program (a calling program such as main program 102 or some of the modules) transfers execution to another (the called program), and (c) the linkage information is used to return control and information to the calling program. This architecture could be called a "boss" architecture. The calling module can be considered a master while the called module can be considered a slave executing commands issued by the master and then reporting results to the master.

Figure 4B:
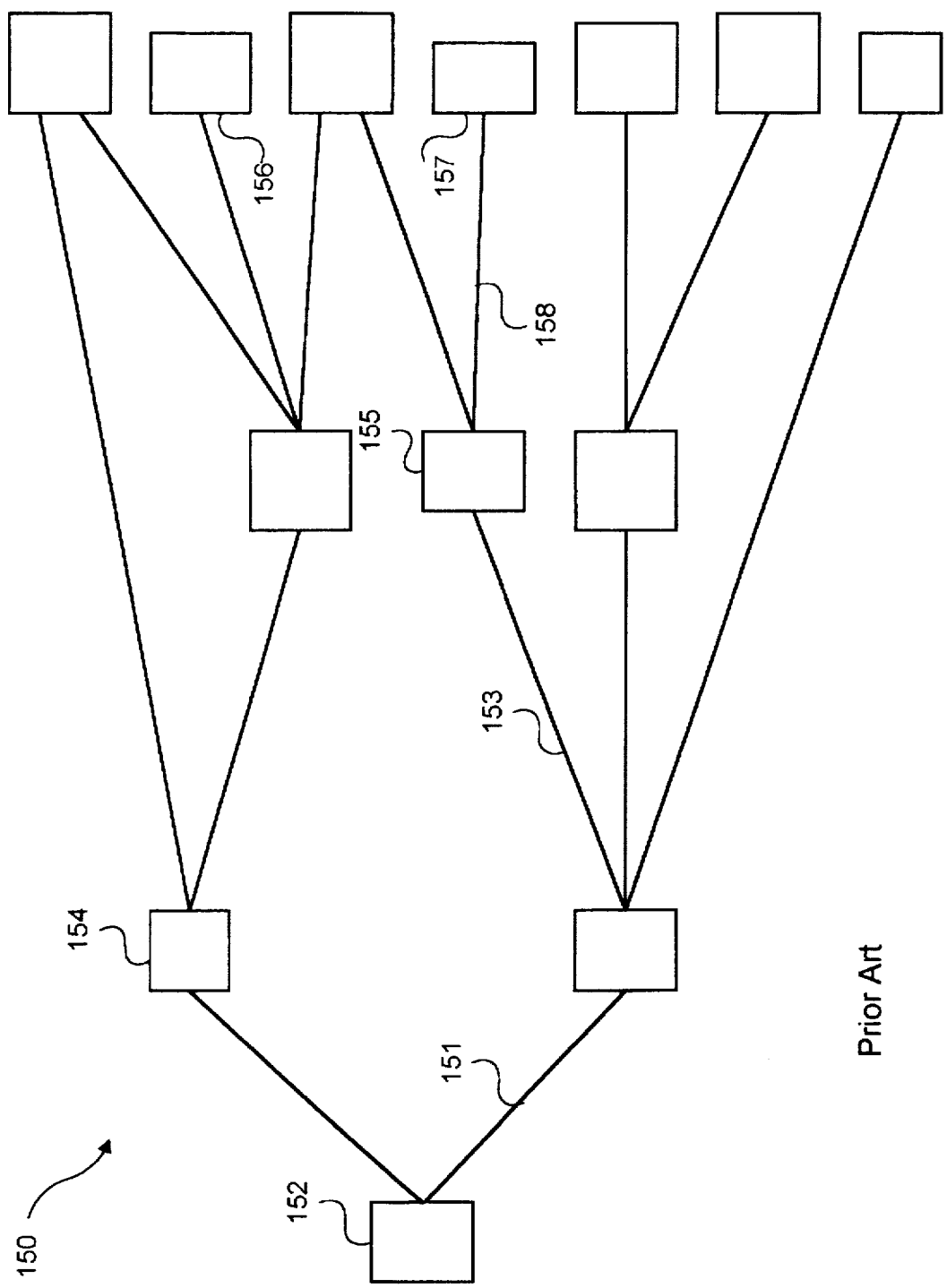

FIG. 4B is a schematic view of an application 150 based on the conventional boss architecture. The architecture is in the form of a hierarchic structure, and a boss module 152 controls a plurality of modules, such as modules 154–157. Solid lines running from the boss to the individual modules are used to graphically depict the chains of command and linkage. When a program module in the lowest level (i.e., module 157 at the end of a branch) is executing, solid lines (i.e., links) 151, 153 and 158 from the boss to that program module must be maintained.

Figure 4C:
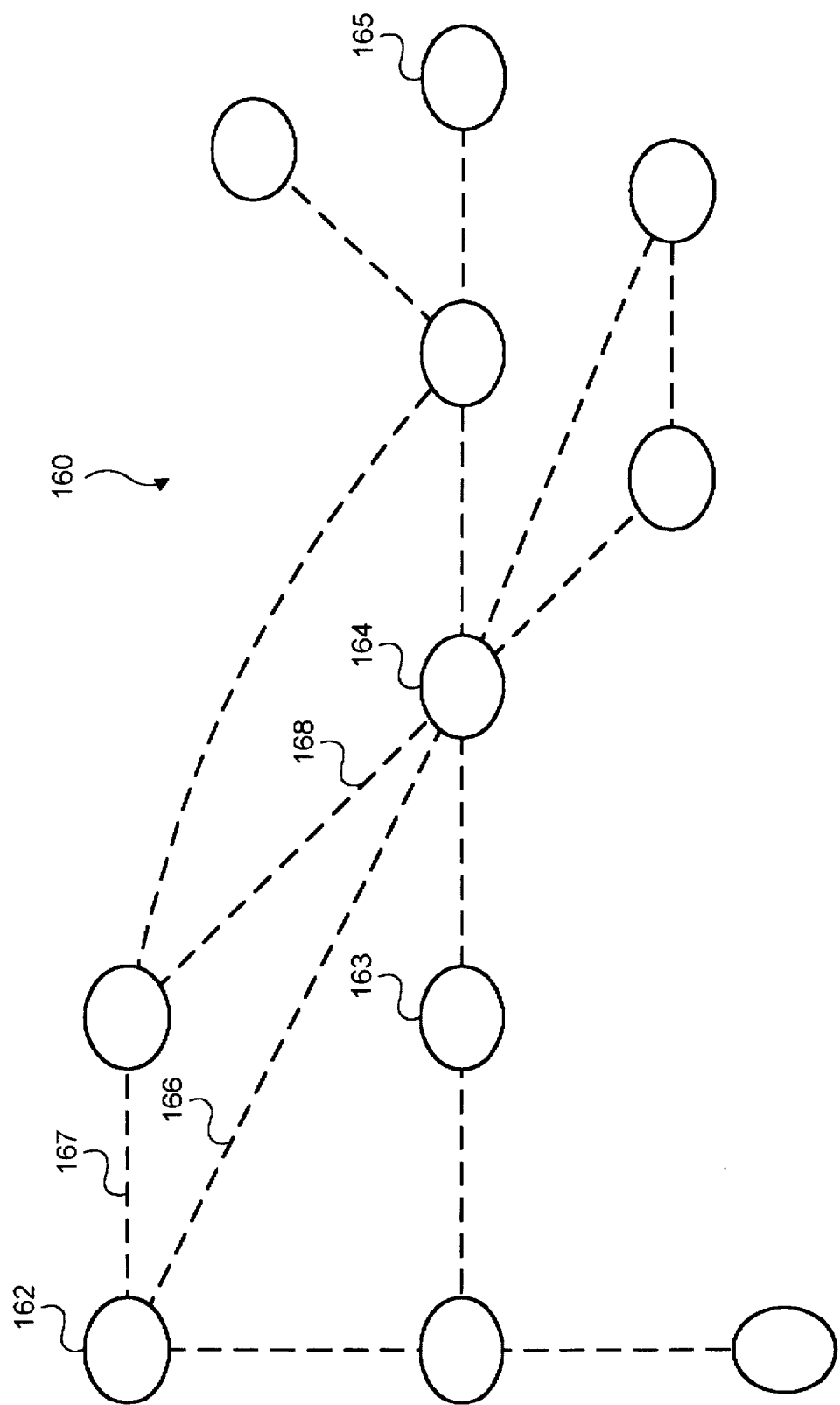
FIG. 4C is a schematic diagram of a "bossless" digital cell technology which can be used to implement the clipboard scanning cell and hyperlink cell of the present invention.

FIG. 4C is a schematic view of an application 160 based on the bossless architecture of the present invention. Application 160 comprises a plurality of program modules, such as modules 162–165. Each program module (called a "cell" in the present invention) is the same as the other cells in an hierarchical sense. Cells are linked together in a novel way in which no history or linkage information needs to be retained. Each link is independent. For example, there is no need for links to be active simultaneously. Each link is direct, i.e., two cells can be linked directly without the need of using one or more intermediate links. For example, cells 162 and 164 can be linked directly using line 166 instead of using lines 167 and 168 and passing through an intermediate cell. An application can be formed by defining the cells involved and using the novel link of the present invention. This is different from the situation in FIG. 4A where the link from the boss to the module at the lowest level must be active at all time while the module is executing. In FIG. 4C, dashed lines are used to graphically depict the novel interaction of the present invention.

Figure 5:
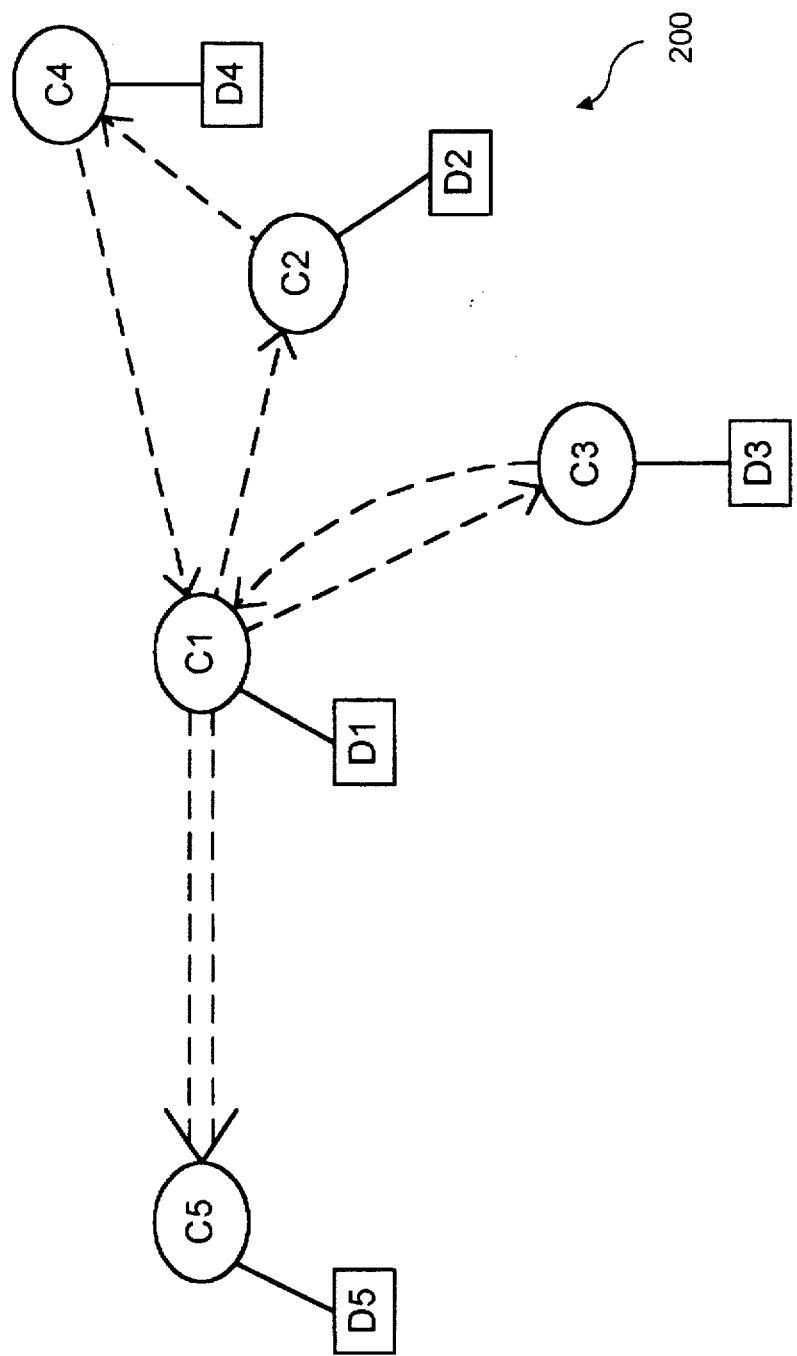
FIG. 5 is a drawing showing the structure of an application using the bossless architecture of the present invention.

FIG. 5 is a drawing showing the structure of an application 200 using the bossless architecture of the present invention. Application 200 contains a plurality of cells, labeled as C1–C4, loaded and executing in RAM. Each cell has an associated file (labeled as D1–D4), called DNA file, which contains information of the cell. The term "DNA" is used here in analogy with the biological relationship between a living cell and its DNA. At a desired time, cell C1 can send statements (called "DSF statements") to cell C2 using a protocol called digital shifting function ("DSF") protocol. Cell C2 will execute these statements. The detail structures of cells, DNA files and the DSF protocol will be described below.

One important distinction of the present invention from conventional inter-process communication is that cell C2 does not retain information on the origin of these statements, i.e., no history of the inter-process communication is kept. Thus, once cell C1 completes its writing of DSF statements to cell C2, there is no further linkage between cells C1 and C2. Cell C2 does not know the origin of these statements during their execution. It is possible for cell C1 to later establish communication with cell C2 again by sending another set of statements to C2. However, this communication is separate from the previous communication, and terminates once the new set of DSF statements is sent.

Each of the cells can send DSF statements to any of the cells it desires. Thus, cell C1 can also send statements to cell C3. Similarly, cell C2 can send statements to cell C4, which in turn can send statements to cell C1. Cell C3 can also send statements to cell C1.

In this example, cells C1 and C2 are not bosses to C4. For example, when C4 is executing DSF statements, there is no need to maintain any links between cells C1 and C2 and between cells C2 and C4. Cell C4 has no obligation to report results of execution to any cells in application 200. Links are maintained only during the time DSF statements are transferred. Further, the writing of statements by cell C1 to cell C2 could be independent of the writing of statements by cell C2 to cell C4. In addition, cell C4 merely execute statements, and does not care where the statements come from. In FIG. 5, dashed lines are used to graphically depict the novel relationship between cells.

As pointed out above, one of the problems of the conventional architecture is that excessive amount of linkage information is retained, thereby slowing down the execution of programs. In the architecture of the present invention, there is no need to save and restore register values on a stack when cell C2 executes statements written by cell C1. There is no need to register cells in a central database prior to sending commands. There is no need to send messages back and forth to report status of execution. As a result, the application can be executed quickly.

Because there is practically no overhead in linking programs, it is possible to design an application using a large number of small cells. In a preferred embodiment, the size of the cells are small. The function of each cell is well defined and focused. As a result, there is flexibility in designing applications and the efficiency in execution improves.

A cell can also invoke another cell (e.g., cell C1 can invoke cell C5, as indicated by the double dashed line), if that cell is not already loaded and running in RAM. The invoked cell (i.e., cell C5) could be completely independent of the invoking cell (i.e., cell C1) after invocation. Thus, the invoking cell is not the boss of the invoked cell and the two cells are hierarchically at the same level. This is completely different from the prior art in which an invoking program module is at a hierarchical different level as the invoked program module.

As explained below, a cell can be implemented as an ".EXE" file (in the MS DOS or MS Windows environment), and can be loaded into RAM for execution using well known methods in accordance with the operating environment. The cell's associated DNA file can also be loaded into RAM. The invoked cell takes on the attributes stored in its DNA cell. It is also possible to modify the DNA file when the cell is invoked or while running by writing to the file (which could be an ASCII file). As a result, the architecture provide a flexible approach to build applications.

It can be seen from FIG. 5 that the bossless architecture has a flat structure instead of a hierarchical architecture of FIGS. 4A and 4B. Each of the cells C1–C4 is an independent executable routine which is at the same hierarchical level as other executable routines. No cell functions as a boss for other cells. Consequently, this architecture is called a bossless architecture.

This architecture allows an application to start at any cell. Other cells can be invoked as needed. This architecture also allows an application to end at any cell. Because there is no chain to unwind, the cells can terminate immediately. There is no need to return to the "boss" program before exiting the application. In one embodiment of the present invention, a cell can exit the application at a predetermined time after invocation of a new cell. In another embodiment of the present invention, other cells can send a DSF statement to this cell requesting it to terminate.

Figure 6:
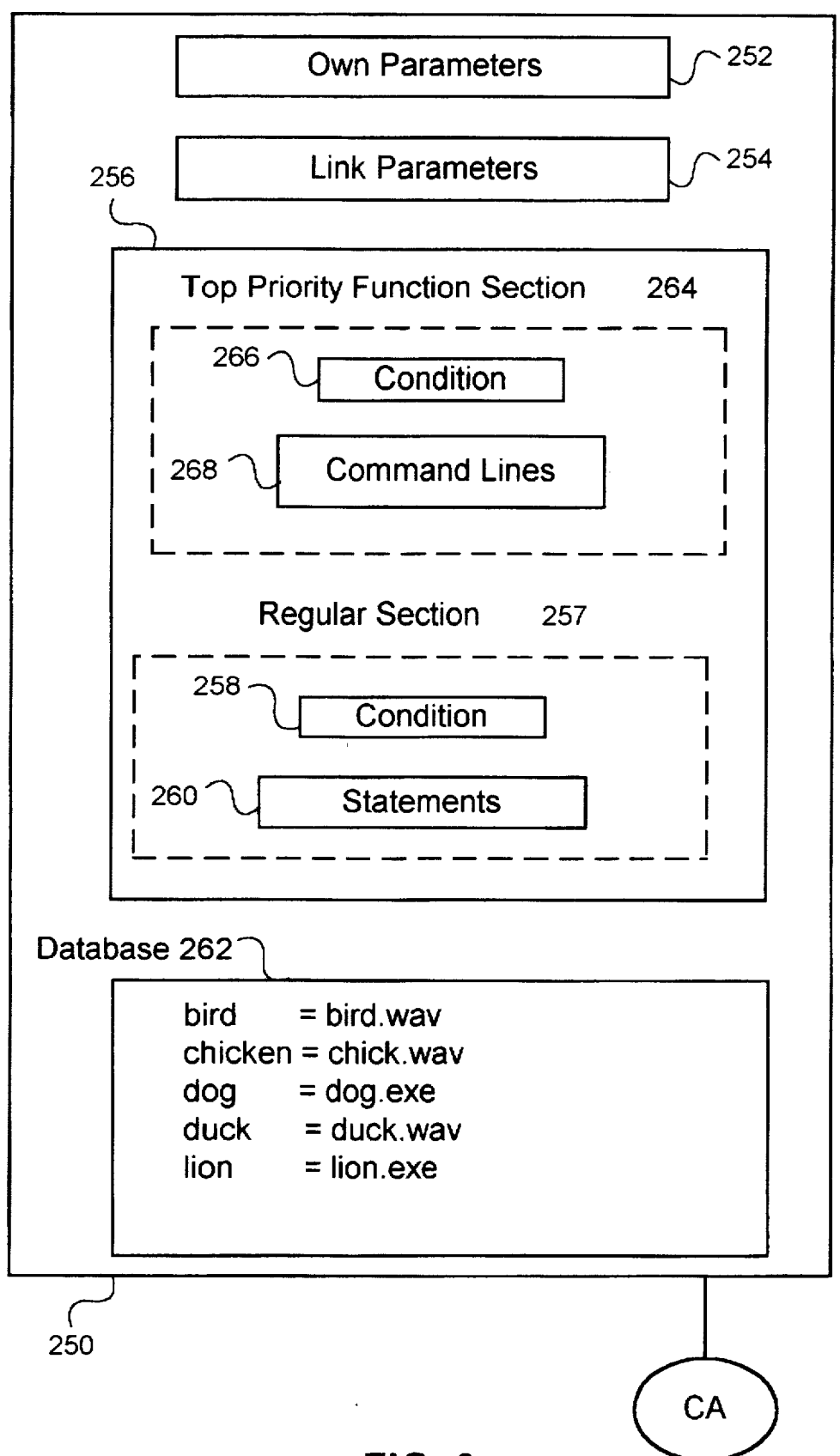
FIG. 6 is a block diagram showing the logical structure of a DNA file associated with a hyperlink cell of the present invention.

FIG. 6 is a block diagram showing the logic structure of a DNA file 250 associated with a cell, such as cell CA. File 250 has a section 252 containing parameters ("own parameters") related to the characteristics of cell CA itself. For example, section 252 may contain parameters related to the way cell CA manifest itself when invoked: the window size and background color of cell CA, the name of cell CA, the names of audio files associated with its invocation and termination, etc.

File 250 also contains a section 254 containing linking parameters ("link parameters") on cells related to cell CA. Examples of the parameters contained in this section are: the names, symbols and positions of the other cells. One of the parameter is "close," which is interpreted as closing cell CA when the cell associated with this parameter is invoked.

If cell CA is a hyperlink cell, file 250 contains a section 262 containing the associated database information. The length of this section could be very long, if the size of the database is large. In one embodiment of the present invention, the content of section 262 is similar to the form shown in database 714 of FIG. 1. Thus, the equal sign is used as the association symbol, the left hand side contains the words to be compared, and the right hand side contains the executable filenames associated with the words at the left hand side.

File 250 further contains a DSF information section 256. This section contains a regular statements section 257 and a top priority function section 264. The structure of the regular section 257 and top priority function section 264 are substantially the same, except that top priority function section 264 has a higher priority in statement execution. These two sections contain individual headers for identifying the sections (e.g., each section headed by a different name or symbol).

Regular section 257 contains a "condition" section 258 and a statements section 260. Statements section 260 comprises DSF statements sent to cell CA by other cells. Statements in statements section 260 are executed sequentially. Examples of statements are "Draw Circle,""Draw Line," and "Scrolling." Each statement also contains parameters necessary for the execution of the statement (e.g., location and diameter of circles). Condition section 258 comprises three components: (a) a first pointer to the last DSF statement currently existing in statements section 260, (ii) a second pointer to the current DSF statement being processed by cell CA, and (iii) the current status of the cell. Examples of status are: ready, busy, lock, and never.

Top priority function section 264 contains a condition section 266 and a command lines section 268. The structure of condition section 266 is similar to the structure of condition section 258 (e.g., both sections contain two pointers). Command lines section 268 contains executable command lines which are sent by other cells using DSF (or similar) protocol. The command lines have a higher execution priority than the statements in statements section 260 (the details of execution priority will be discussed below in connection with FIG. 7). The command lines in command lines section 268 are executed sequentially. Examples of commands in section 268 are close, min (for minimizing a window), max (for maximizing a window), restore, etc.

It should be appreciated that the logic structure shown in FIG. 6 can be implemented using one or more physical files. Further, portions of the logical sections may intermingle physically. In one embodiment of the present invention, the DNA file is a text file. Thus, the content of the DNA file can be modified by using a regular text editor.

Statements sent by one cell to another follow the DSF protocol. A sending cell (e.g., cell CS) sets up a communication link with the DNA file 250 associated with cell CA. Specifically, it looks up the address of DNA file 250 and determines whether DNA file 250 is able to accept DSF statements (e.g., at a "ready" state) by examining its status in condition section 258. Statements will be issued by cell CS only when cell CA is ready to accept them. In one embodiment, the issuance of statements involves writing ASCII characters (e.g., the ASCII characters for "Draw Circle") to statements section 260 of DNA file 250.

When cell CS is authorized to issue statements to cell CA, cell CS reads the first pointer (in condition section 258) to the last DSF statement to determine the appropriate address to write the DSF statements. It is important not to overwrite DSF statements already existed in cell CA. Cell CS writes DSF statements to statements section 260 of DNA file 250. Cell CS also updates the first pointer in condition section 258 so as to point to the last DSF statement newly written into statements section 260. The communication link between cells CA and CA is terminated. It can be seen that cell CA and DNA file 250 do not maintain record (i.e., history) indicated that these new statements originate from cell CS.

It should be appreciated that the above described DSF protocol is only an exemplary protocol. Other protocol could be used to write DSF statements to cells. For example, different pointer structures can be used, e.g., the first pointer can point to the position after the last DSF statement. Different types of status and different ways for checking status information can be used. Further, the statements could be stored in accordance with a logic structure instead of stored physically in a sequential manner. For example, the statements could be organized into groups with the address of each group pointed to by a pointer.

Command lines are sent by one cell to another using a protocol substantially the same as the DSF protocol. Because regular statements section 257 and top priority function section 264 have different headers, the sending cell can distinguish between these two sections and write to the appropriate section. Other means for identifying these two section can also be used (e.g., maintaining separate linked lists of statements and command lines).

Because DSF statements/commands are executed sequentially (either physically or logically), cell CA needs to complete execution of statements/commands (if any) preceding the above mentioned statements/commands written by cell CS. This set of previously written statements/commands are likely to be written by other cells (although it is also possible that it is written by cell CS in a prior communication link).

After the set of previously written statements/commands has been executed and prior to the execution of the statements/commands written by cell CS, cell CA does not have to take any action with respect to the cell which wrote the first set of statements/commands (e.g., no "return" is needed). This aspect of the present invention is different from conventional programming architecture.

Note that the communication link between cells CA and CS can be terminated prior to the execution of the first statement/command sent by cell CS (for example, the previously written DSF statements/commands have not yet be executed completely when cell CS finishes sending DSF statements to cell CA). This is different from conventional linking in which communication link between two program modules is completed only after the task relating to these two modules is executed completely.

In a different embodiment of top priority function section 264, command lines section 268 allows only one command. In this embodiment, there is no need to have pointers. Thus, condition section 266 can be removed from top priority function section 264. Other cells can write a single command to top priority function section 264 because this section is separated from other sections by a header.

Figure 7:
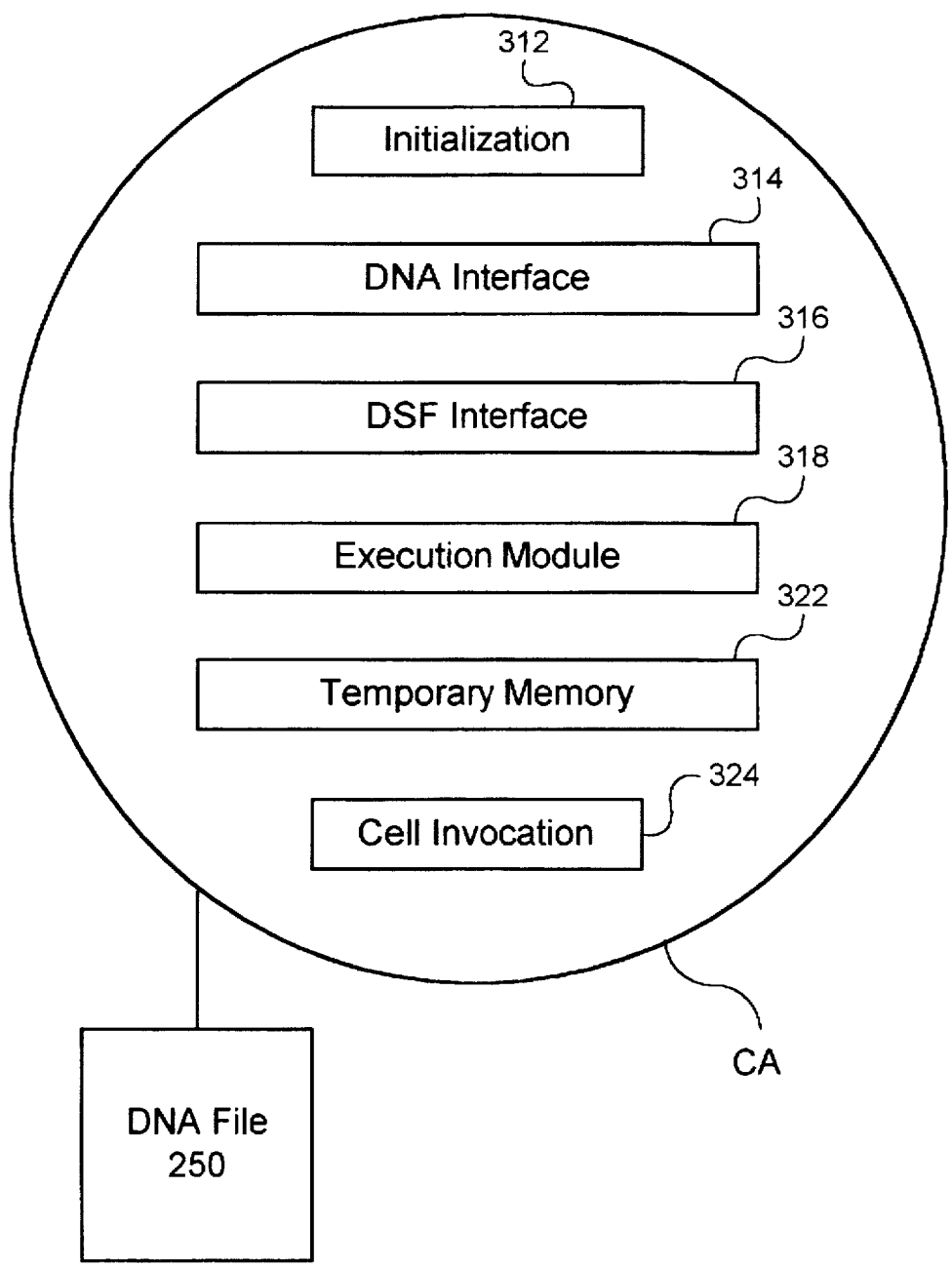
FIG. 7 is a block diagram of the logical structure of a cell of the present invention.

FIG. 7 shows the structure of cell CA. It is grouped logically into a plurality of sections, each implemented using instructions executable by a computer. Cell CA contains an initialization section 312 and a DNA interface section 314. DNA interface section 314 allows cell CA to read from to its corresponding DNA file 250. Initialization section 312 takes care of housekeeping tasks when invoked, including reading parameters from "own parameters" section 252 of DNA file 250. Cell CA also contains a section 316 for processing DSF protocol. This section contains code (or program instructions) for sending and receiving statements/command lines using the DSF protocol.

Cell CA contains an execution section 318 containing code for automatically executing statements and command lines in DNA file 250 written by other cells. The code sequentially read and execute statements in statements section 260 of DNA file 250. After each statement is executed, cell CA branch to top priority function section 259 and executes all the command lines therein. Cell CA then executes the next statement in statement section 260.

An example is used to illustrate the execution steps. In this example, statements section 260 contains two statements, "Draw Circle" and "Draw line," while the top priority function section 259 contains one command line, "Max". When cell CA reads a "Draw Circle" statement and its associated parameters, the code will perform a graphic algorithm for drawing a circle at an appropriate place with an assigned diameter (as determined by the associated parameters). Cell CA then branches to top priority function section 259 and executes the "Max" command, which causes a window associated with cell CA to enlarge. Cell CA returns to statements section 260 and executes the next statement, i.e., the "Draw Line" statement. Cell CA executes a graphic algorithm which draws a line in accordance with the parameters associated with the "Draw Line" statement.

In the above example, if the command line in top priority function section 259 contains a "Close" command, cell CA will close itself. In this situation, the "Draw Line" statement will not be executed.

In one embodiment of the present invention, cell CA reads statements section 260 at predetermined times regardless whether statements are present in DNA file 250 (i.e., similar to a polling arrangement). In another embodiment of the present invention, a cell sends a signal to cell CA, either directly or indirectly (e.g., through an operating system), after sending statements to DNA file 250. Upon receiving the signal, cell CA executes the statements in statements section 260 until all the statements have been executed. Cell CA then waits for another signal. This embodiment is similar to an interrupt arrangement. Thus, the execution of statements is carried out automatically in both embodiments.

Cell CA contains a temporary memory section 322 for storing temporary information. As an example, it is possible to change attributes (e.g., background color and the size of the display window) of cell CA during its execution. In one embodiment of the present invention, the changed attributes are temporarily stored in temporary memory section 322 instead of immediately being written to DNA file 250. In this embodiment of cell CA, the attribute information stored in temporary memory section 322 is written into "own parameters" section 252 of DNA file 250 only when cell CA is terminated.

Cell CA also contains a cell invocation section 324 for invoking other cells. In one embodiment of the present invention, this section obtains information about the cell desired to be invoked and pass this information to a specialized cell which actually invoke the desired cell. It is also possible to incorporate the functionality of this specialized cell in the cell invocation section of cell CA and other cells.

It should be appreciated that the above mentioned sections in cell CA are grouped logically, and portions of these sections could intermingle physically.

It can be seen from the above described structures of cell CA and its associated DNA file 250 that both cell CA and DNA file 250 do not keep track of the origin of the DSF statements. A cell may accept DSF statements (stored in its associated DNA file) from many cells. After the DSF statements have been received, the linkage between the originating and destination cells is terminated. The cell executes DSF statements contained in its associated DNA file without knowledge of how the statements arrive the DNA file. As a result, there is no need to "return" to any cell.

Typically, the size of each cell is small and the function of the cell well defined. Consequently, the execution speed is fast. As a result of the small size and specialized function, the cells can be easily written to fully utilize the resources of a computer. The communication between cells using DSF is direct, with minimum amount of access to the operating system on which an application is run. As a result, the efficiency is high.

The architecture of the digital cell technology comprises at least two cells which can communicate with each other. The cells are encapsulated program modules that are specialized for their designed tasks. Therefore, applications developed using the present architecture comprise of multiple executables which can run independently or concurrently. The cells interact with each other using the inventive DSF protocol. Each cell can control the action of other cells. For example, a first cell can control a second cell, and the second cell can control the first cell. Therefore, no single cell has complete control over the other cells, or in other words, there is no boss. On the other hand, under conventional architectures, program modules subordinate to a boss cannot control the boss. Another unique characteristic of the present architecture is that the cell that receives a command does not keep any information of where the command came from. This lack of historical knowledge allows cells to move forward instead of going backward in a link.

This technology is called the "digital cell technology" because the structure of program modules and the interaction between them are similar to biological cells. Some of the similarities are listed here: (i) an application is made up of many cells dynamically interacting with each other, (ii) many cells can be active at a time, (iii) the interaction of a pair of cells can be independent of interaction of other pairs of cells, (iv) control is distributed instead of centralized, and (v) each cell is associated with a DNA structure which guides the behavior of the cell.

One of the embodiments of the present invention is an application development system which runs under Microsoft's MS Windows. In this environment, cells are programs stored as ".EXE" files and typically show a window on a computer monitor when invoked. By linking these cells, a user can construct an application software just like assembling blocks. Each cell, with its specific function, is given another function or value through DSF protocol with other cells to produce a variety of applications.

Figure 8:
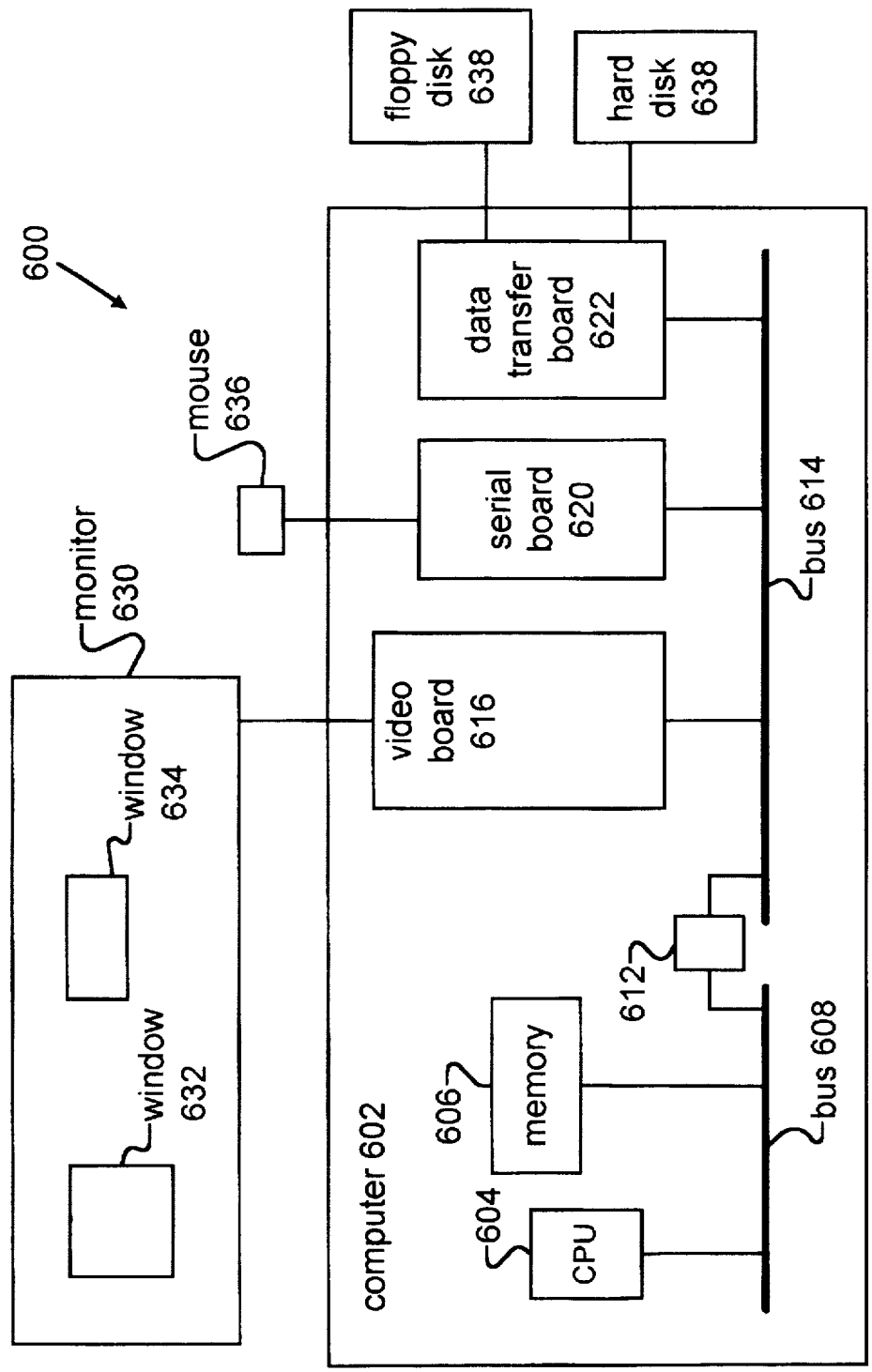
FIG. 8 is a block diagram of a computer system which can be used to run the flexible hyperlink association program of the present invention.

FIG. 8 shows a block diagram of a computer system 600 which can be used to run the database system of the present invention. Computer system 600 comprises a computer 602 having a central processing unit (CPU) 604 and system memory 606, which could be random access memory (RAM) or read-only memory (ROM), coupled to a system bus 608. Computer 602 also contains a peripheral bus controller 612 for controlling a peripheral bus 614. Depending on the architecture of computer 602, peripheral bus 614 could be a PC1 bus, VESI local bus, ISA bus, or other similar buses. Peripheral bus 612 allows peripheral boards to be connected to computer 602. Examples of peripheral boards are a video board 616, a serial board 620 and a data transfer board 622. CPU 604 and RAM 606 can communicate with the peripheral boards through peripheral bus controller 612.

Serial board 620 allows serial communication between computer 602 and one or more external serial devices, such as a mouse 636.

Video board 616 contains circuits to control a monitor 630 and images timages thereon. Video board 616 also contains memory (not shown) associated with such display. The memory is preferably a special kind of memory integrated circuit device, called video RAM (VRAM), designed for video applications. The circuits draws images on monitor 630 based on information stored in the memory. The images are on monitor 630 are updated at predetermined time intervals.

If computer system 600 is used to run programs in a windows-based environment, one or more windows, such as a windows 632 and 634, could be displayed on monitor 630.

Disk controller board 622 is connected to a hard disk 638 and a floppy disk driver 638. The MS Windows and the operating system are generally stored in hard disk 638. The cells can be stored in floppy diskettes and downloaded into hard disk 638. In one embodiment of the present invention, individual cells (e.g., the hyperlink cell and the clipboard scanning cell) and the databases can be stored in diskette. These diskettes can be distributed to end users. The diskettes can be loaded into hard disk 638.

An application cell (such as a word processor cell) is loaded into system memory 606 and executing in computer system 600. A user can enter text (such as text string 706 in FIG. 1) into a window on monitor 630. The hyperlink and clipboard scanning cells are also loaded into system memory 606.

If the database is not stored in the DNA file of hyperlink cell, the database is also be loaded into system memory 606. The location of the database should be identified to the hyperlink cell so that the hyperlink cell can access the database. The user can then invoke different computer operations using the procedure described in connection with FIG. 1.

The invention has been described with reference to a specific exemplary embodiment thereof. Various modification and changes may be made thereunto without departing from the broad spirit and scope of the invention.

The specification and drawings are, accordingly, to be regarded in an illustrative rather than a restrictive sense; the invention is limited only by the provided claims.

What is claimed is:

1. A method for a computer to perform an operation associated with data on a display device and chosen by a user, comprising the steps of:

providing a file having data intended to be displayed on said display device, at least a portion of said data containing no embedded link to other files;

displaying said data of said file on said display device, said portion of said data being displayed in a manner indicating lack of said embedded link;

providing a database containing a list of data and a list of program modules, members of said list of data being associated with members of said list of program modules;

highlighting, by said user, desired data associated with said portion on said display device;

comparing said highlighted data with said members in said list of data; and if a match is found, executing said program module associated with said matched member.

2. The method of claim 1 further comprising the step of editing said database to associate a program module with said highlighted data if said highlighted data does not match any member in said list of data.

3. The method of claim 2 wherein said editing step further comprises the step of providing a dialogue box for entering the name of a computer module associated with said unmatched highlighted data.

4. The method of claim 1 further comprising the step of capturing said highlighted data into a buffer, wherein said comparing step compares data in said buffer with said members in said list of data.

5. The method of claim 4 wherein said buffer is a clipboard buffer.

6. A method for a computer to perform an operation associated with data on a display device and chosen by a user, comprising the steps of:

providing a file having data intended to be displayed on said display device, at least a portion of said data containing no embedded link to other files;

displaying said data of said file on said display device, said portion of said data being displayed in a manner indicating lack of said embedded link;

providing a first database and a second database each containing a list of data and a list of program modules, members of said list of data being associated with members of said list of program modules;

selecting one of said first and said second databases to be an active database;

highlighting, by said user, desired data associated with said portion on said display device;

comparing said highlighted data with said members in said list of data of said active database; and if a match is found, executing said program module associated with said matched member.

7. The method of claim 6 further comprising the step of capturing said highlighted data into a buffer, wherein said comparing step compares data in said buffer with said members in said list of data of said active database.

8. A computer system for performing an operation associated with data in a file intended to be displayed on a display device and chosen by a user, said data of said file having at least a portion containing no embedded link to other files; said system comprising:

means for displaying said data of said file on said display device, said portion being displayed in a manner indicating lack of said embedded link;

a database containing a list of data and a list of program modules, members of said list of data being associated with members of said list of program modules;

means for allowing said user to highlight desired data associated with said portion on said display device;

means for matching said highlighted data with one of said members in said list of data; and means for executing said program module associated with said matched member.

9. The computer system of claim 8 further comprising a buffer for storing said highlighted data and means for capturing said highlighted data to said buffer, wherein said means for matching matches said data in said buffer with one of said members in said list of data.

10. A computer system for performing an operation associated with data in a file intended to be displayed on a display device and chosen by a user, said data of said file having at least a portion containing no embedded link to other files; said system comprising:

means for displaying said data of said file on said display device, said portion being displayed in a manner indicating lack of said embedded link, a database containing a list of data and a list of program modules, members of said list of data being associated with members of said list of program modules;

means for allowing said user to highlight desired data associated with said portion on said display device;

a first computer program and a second computer program;

said first computer program comprising:
means for capturing said highlighted data; and
means for sending said captured data to said second computer program; and said second computer program comprising:
means for receiving said captured data from said first computer program;
means for matching said captured data with said members in said list of data; and
means for executing said program module associated with said matched member.

11. The computer system of claim 10 wherein said first and said second computer programs are cells, and wherein said means for sending comprises a DSF statement having said captured data as a parameter.

* * * * *